(12) United States Patent
Stiefel

(10) Patent No.: US 9,233,446 B2
(45) Date of Patent: Jan. 12, 2016

(54) TOOL TURRET

(75) Inventor: Jürgen Stiefel, Kohlberg (DE)

(73) Assignee: SAUTER FEINMECHANIK GMBH, Metzingen (DE)

( * ) Notice: Subject to any disclaimer, the term of this patent is extended or adjusted under 35 U.S.C. 154(b) by 476 days.

(21) Appl. No.: 13/261,478

(22) PCT Filed: May 17, 2011

(86) PCT No.: PCT/EP2011/002428
§ 371 (c)(1),
(2), (4) Date: Oct. 18, 2012

(87) PCT Pub. No.: WO2011/147543
PCT Pub. Date: Dec. 1, 2011

(65) Prior Publication Data
US 2013/0055538 A1      Mar. 7, 2013

(30) Foreign Application Priority Data

May 28, 2010  (DE) .......................... 10 2010 021 948
May 28, 2010  (DE) .......................... 10 2010 021 949

(51) Int. Cl.
| | |
|---|---|
| *B23B 29/32* | (2006.01) |
| *B23Q 11/04* | (2006.01) |
| *B23Q 16/02* | (2006.01) |
| *B23B 31/107* | (2006.01) |

(52) U.S. Cl.
CPC ............... *B23Q 16/02* (2013.01); *B23B 29/32* (2013.01); *B23B 31/1076* (2013.01); *B23Q 11/04* (2013.01); *B23Q 16/025* (2013.01); *B23Q 2220/002* (2013.01); *Y10T 29/5154* (2015.01); *Y10T 82/2587* (2015.01)

(58) Field of Classification Search
CPC ............ Y10T 82/2587; Y10T 29/5155; Y10T 29/5154
USPC .......................................... 29/39–40; 82/159
See application file for complete search history.

(56) References Cited

U.S. PATENT DOCUMENTS

| 5,632,075 A | 5/1997 | De Bernardi et al. |
| 7,475,463 B1 | 1/2009 | Chang et al. |
| 2015/0075573 A1* | 3/2015 | Hirasaka ............... B23B 29/323 408/35 |

FOREIGN PATENT DOCUMENTS

| DE | 37 22 643 C1 | 10/1988 |
| DE | 3833511 C2 | 4/1990 |

(Continued)

OTHER PUBLICATIONS

Machine Translation of EP 799663, which EP '663 was published Jul. 1999.*

*Primary Examiner* — Erica E Cadugan
(74) *Attorney, Agent, or Firm* — Wenderoth, Lind & Ponack, L.L.P.

(57) ABSTRACT

A tool turret includes a tool disk (1) having at least one tool receptacle (7) for a machining tool and being fastened to an accommodating disk (51). The disk can be swiveled about a support column that defines a swivel axis into positions in which the particular machining tool is in a working position. A contact surface (55) is provided on the tool disk (1) and can be clamped to an accommodating surface (53) on the accommodating disk (51) by a clamping device. The clamping device has an annular groove on one disk to be clamped. The annular groove is concentric to the swivel axis, is open radially outside and has at least one inner slanted surface (81). At least one compression piece (57) is on the other disk, penetrates the annular groove (61) under compressive force and has a wedge surface (79). In interaction with the slanted surface (81) of the annular groove (61), the wedge surface produces a force component as a clamping force from the compressive force pressing the contact surface (55) and the accommodating surface (53) against each other.

11 Claims, 5 Drawing Sheets

(56) References Cited

FOREIGN PATENT DOCUMENTS

| | | |
|---|---|---|
| DE | 198 38 505 A1 | 3/2000 |
| DE | 101 30 446 A1 | 1/2003 |
| DE | 10 2007 061 793 B3 | 2/2009 |
| EP | 0 674 122 B1 | 7/1998 |
| EP | 0 799 663 B1 | 7/1999 |
| EP | 2 185 318 B1 | 3/2011 |

* cited by examiner

Alternative Embodiment Wherein the Clamping Device Includes an Annular Groove on the Tool Disk and a Pressure Piece on the Receiver Disk

FIG. 5

TOOL TURRET

FIELD OF INVENTION

The invention relates to a tool turret comprising a tool disk having at least one tool holder for a machining tool and being fastened to a receiver disk. The receiver disk can be swiveled around a support column, defining a swivel axis, into positions in which the particular machining tool is in a working position. The tool disk has a contact surface that can be clamped to a receiving surface on the receiver disk by a clamping device.

BACKGROUND OF THE INVENTION

Tool turrets of this kind are known from the prior art. For example, U.S. Pat. No. 7,475,463 discloses a receiver disk to which the tool disk is fastened. This receiver disk forms both a supporting element, at which the tool disk is held for its swivel movements, and at the same time the output-side element of the swivel drive for positioning the respective machining tools into the desired working positions. When such units are in operation, the tool disk, which forms the turret head, is subject to high loads with correspondingly high torques that try to twist the tool disk out of the target position, when, for example, rotary tools for high cutting performances or stationary tools, for example, turning tools for lathe work or the like, are fastened to the tool disk. To ensure high quality machining under such conditions, special arrangements need to be made that will guarantee a secure attachment of the tool disk to the receiver disk.

In the state of the art, the tool disk has screw bolt holes to screw the tool disk to the receiver disk from the inside of the turret head using machine screws. Such solutions are not completely satisfactory. In addition to the production and assembly costs, a threaded joint between the tool disk and the receiver disk renders achieving a safety function difficult. The safety function allows the tool disk to rotate with the turret head relative to the receiver disk in case of an emergency to prevent the swivel drive and/or the turret head from being damaged in a "crash case" during the ongoing operations.

SUMMARY OF THE INVENTION

An object of the present invention is to provide an improved tool turret distinguished by a clamping device for fastening the tool disk to the receiver disk, which clamping device is easy to build and guarantees a high degree of operational reliability.

The present invention basically achieves this object with a tool turret where, instead of a threaded joint provided between the tool disk and the receiver disk, the position is secured by generating a compression force between the tool disk-side contact surface and a receiving surface of the receiver disk. In this case, this compression force is generated by a wedge effect between an annular groove concentrically surrounding the swivel axis and forming an inclined surface, and at least one pressure piece penetrating the annular groove under compression force. This pressure piece has a wedge-shaped surface. In interaction with the inclined surface of the annular groove, the wedge-shaped surface generates a force component that forms the clamping force.

Not only does the above feature of the invention allow the tool disk to be free of boreholes, it also opens up the advantageous possibility of dimensioning the compression force, generated by way of the wedge effect, between the contact surface and receiving surface in such a way that the resulting frictional locking enables a slippage when a critical threshold value of the torque is exceeded. Therefore, given the ease with which the clamping device can be built, the invention offers the additional advantage that the mandatory safety function is simultaneously fulfilled without having to introduce additional design measures for this purpose.

For the optimal dimensioning of the clamping force that yields the desired frictional locking and that is obtained by the wedge effect, preferably a plurality of pressure pieces interact with the annular groove.

In especially advantageous exemplary embodiments, the annular groove is formed in a cylindrical outer surface provided on the receiver disk and concentric to the swivel axis. In this case, the tool disk has a shoulder extending over the cylindrical outer surface. On that shoulder preferably more than one pressure piece is arranged. At the same time, the cylindrical outer surface of the receiver disk and the cylindrical inner surface of the shoulder of the tool disk form fitting surfaces for centering the tool disk on the receiver disk.

In especially advantageous exemplary embodiments, the receiver disk is formed by a flange-like expansion on the end of a hollow shaft surrounding the support column. In this case, the end-side front face of the expansion that defines a radial plane forms the receiving surface, which receiving surface can be pressed against the contact surface that forms a radial plane that internally defines the shoulder of the tool disk.

The annular groove can have advantageously a V-shaped cross section. The respective pressure piece can have a wedge-shaped piece that forms the wedge-shaped surface. Their relative position and dimensions can be chosen such that the wedge-shaped surface interacts with that side wall of the groove that forms the inclined surface for generating the clamping force component.

The arrangement can be configured in an advantageous way that the respective pressure piece is arranged in a radial borehole provided in the shoulder of the tool disk and having an internal thread for a threaded joint that generates the compression force. In this case, the pressure piece is made of the actual wedge-shaped piece forming the wedge-shaped surface that interacts with the inclined surface of the groove, and of a threaded piece rotatable relative to this wedge-shaped piece and being a part of the threaded joint. The clamping device designed in this way is distinguished by an extremely simple design and ease of operability.

The radial borehole can be designed preferably such that it forms an outer threaded section for the external thread of the threaded piece and a non-threaded inner guide section forming a fit for guiding the wedge-shaped piece.

With respect to extreme ease of assembly, the wedge-shaped piece and the threaded piece can be connected together such that they can be rotated, but not detached.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure:

FIG. 5 schematically shows an alternative embodiment.

DETAILED DESCRIPTION OF THE INVENTION

Figure 1:
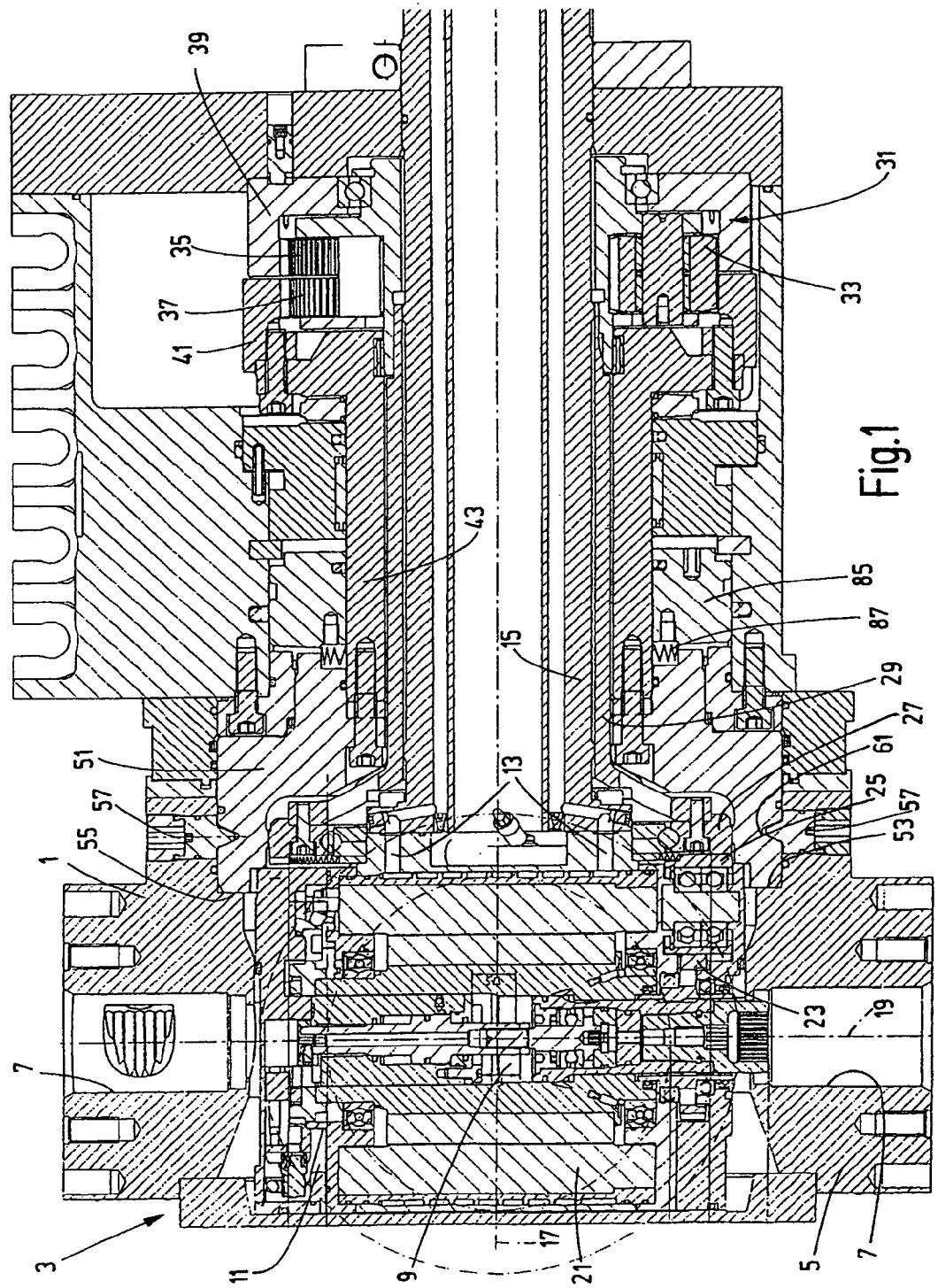
FIG. 1 is a side elevational view in section of a tool turret according to an exemplary embodiment of the invention, with a tool holder of the tool disk, forming the turret head, being in a working position, but without the machining tool inserted into the tool holder.

In the drawings, a tool disk 1 forms the main component of a turret head 3 in FIG. 1. The tool disk 1 forms a peripheral annular body 5 provided with the tool holders 7. Tool holders 7 can range in number, for example, up to 16 tool holders and are spaced apart from each other at regular intervals over the periphery. FIG. 1 shows two tool holders 7. One tool holder 7 is in a working position, in which a machining tool, accommodated, as required, if it concerns a rotary tool (not shown in FIG. 1), can be coupled with a drive device or drive 9 that can be engaged and disengaged and that is intended for the rotary drive of the rotary tool concerned. The drive device 9 is located in the inner receiving space 11 of the turret head 3. This inner receiving space is formed between the annular body 5 of the tool disk 1. The module that forms the drive device 9 is rigidly connected, that is, cannot be rotated, to the support column 15 by connecting screws 13 (of which just a few are labeled in FIG. 1). The tool disk 1 can be rotated around the swivel axis 17, defined by the support column 15, to adjust the working positions. In the swivel position of the turret head 3 shown in FIG. 1, the tool holder 7 located at the bottom in FIG. 1 is in alignment with the rotational axis 19 of the motor shaft of the electric motor 21 located in the receiving space 11 for the direct drive of a rotary tool (not illustrated) located in the tool holder 7. This motor 21 also forms the drive source for the swivel drive for rotating the tool disk 1 around the swivel axis 17. For this purpose, the motor shaft of the electric motor 21 can be connected to an intermediate gear having gearwheels 23 and 25. The gearwheel 25 meshes with the Hirth coupling on a gear rim 27 that is located as the flange-shaped expansion on the end of the hollow shaft 29 surrounding coaxially the support column 15. The hollow shaft 29 forms the input shaft for a Wolfrom planetary gear 31 mounted on the support column 15 to be axially offset relative to the turret head 3. This planetary gear has, according to the known Wolfrom system, at least one planet wheel 33 that meshes with the internal teeth 35 and 37 formed on a housing part 39 that is stationary with the support column 15 or a rotatable housing part 41. At the same time, the internal teeth 37 and 35 have a slightly different number of teeth, so that, according to the Wolfrom principle, the rotatable housing part 41 has a much lower speed compared to the input speed of the hollow shaft 29. This greatly reduced speed that is appropriate for the swivel drive of the tool disk 1 is transferred to the receiver disk 51 by an output-side hollow shaft 43 that also surrounds coaxially the support column 15. This receiver disk 51 is attached on the end of the hollow shaft 43 in the form of a collar-shaped expansion and forms the receiving surface 53 that can be clamped with the contact surface 55 onto the tool disk 1.

Figure 2:
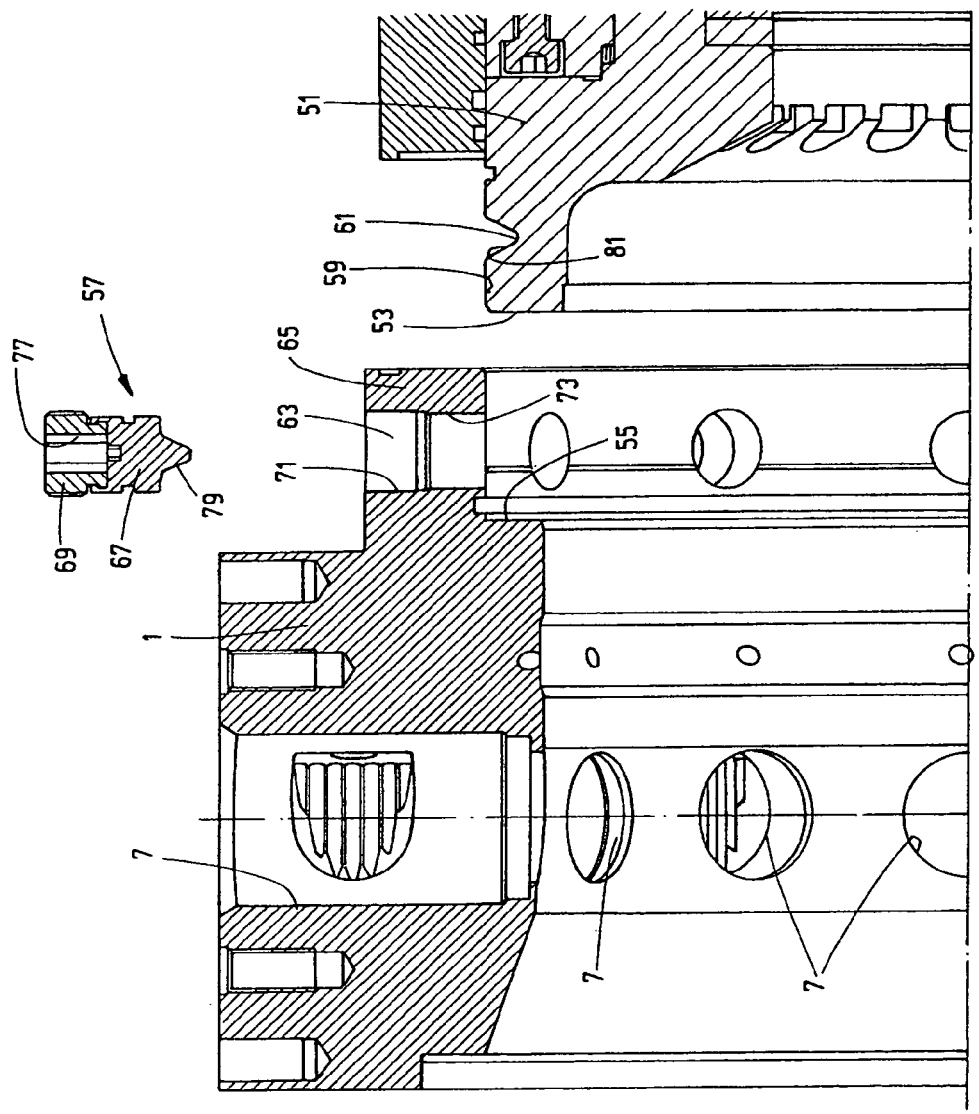
FIG. 2 is a partial side elevational view in section (drawn slightly smaller than a practical embodiment) of just one circumferential section of the tool disk, the associated peripheral region of the receiver disk, and a pressure piece of the clamping device of the tool turret of FIG. 1, with these parts shown in an exploded position relative to each other.
Figure 3:
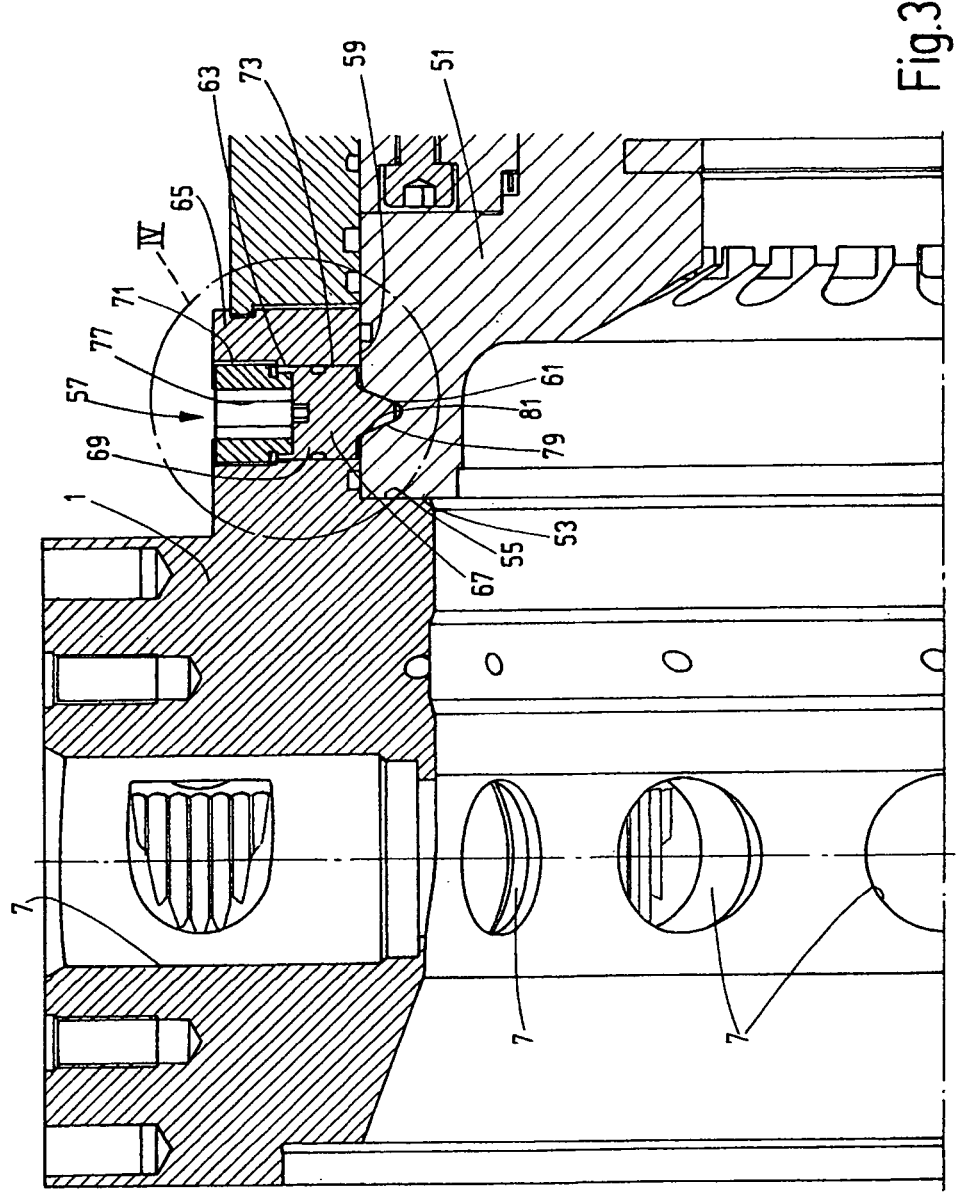
FIG. 3 is a side elevational view in section of the tool turret of FIG. 2, with the tool disk and the receiver disk being fastened to each other by the pressure piece that can be found in the working position.
Figure 4:
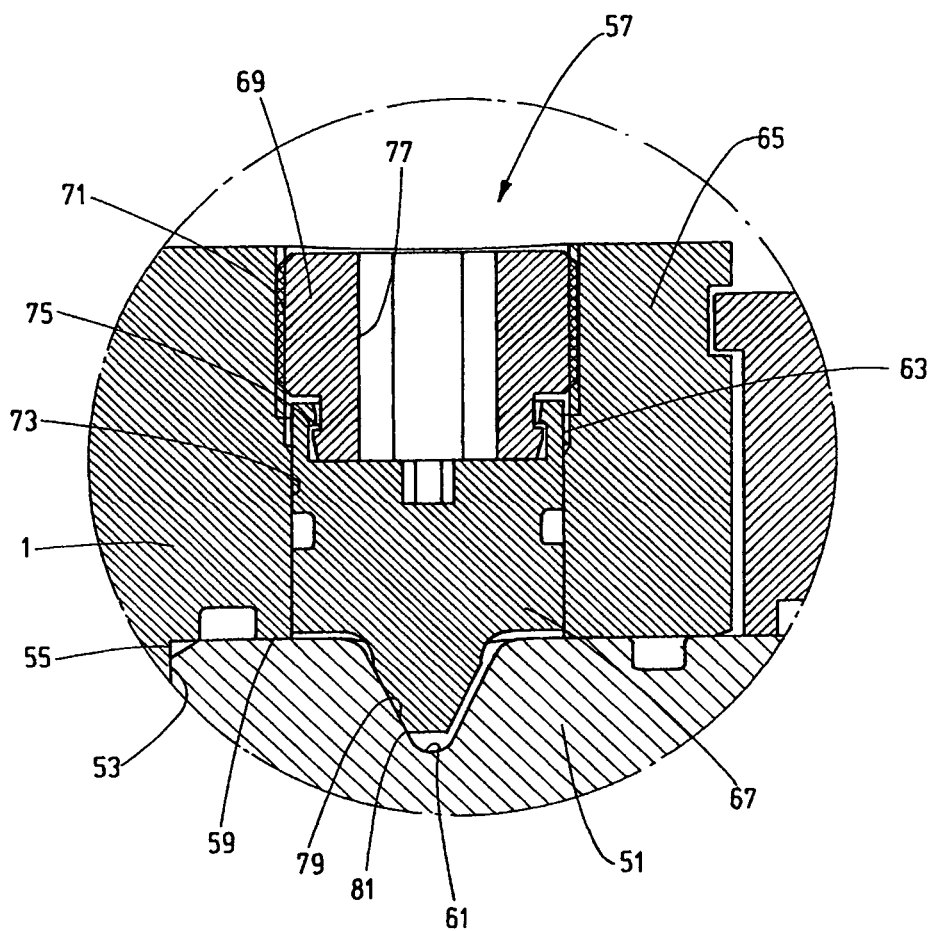
FIG. 4 is an enlarged, partial side elevational view of the region IV in FIG. 3.

Further details of the clamping device for clamping the contact surface 55 of the tool disk 1 onto the receiving surface 53 are explained below with particular reference to FIGS. 2 to 4. FIG. 2 is a sectional view of the peripheral sections of the tool disk 1, without the associated structural components, and the receiver disk 51 in an exploded position relative to each other, and a pressure piece 57 as a component of the clamping device. This clamping device has a circumferentially continuous annular groove 61 with a V-shaped cross section in a radially external cylindrical outer surface 59 of the receiver disk 51. This annular groove 61 interacts with the pressure pieces 57 for the clamping operation. Of these pressure pieces, two pressure pieces 57 are shown in FIG. 1; and FIGS. 2 to 4 show in each instance one pressure piece 57. For each of these pressure pieces 57, the tool disk 1 has a radial borehole 63 located in a shoulder 65 of the tool disk 1. In the fastened state (see FIG. 3), the shoulder extends over the cylindrical outer surface 59 of the receiver disk 51.

FIGS. 2 and 4 show distinctly that the pressure pieces 57 are made in two parts and have a wedge-shaped piece 67 and an actuating element in the form of a threaded piece 69 for the interaction with the annular groove 61. The radial boreholes 63 have an outer threaded section 71 for the respective threaded piece 69 and an internal guide section 73 for the wedge-shaped piece 67. This internal guide section forms a fit, in which the wedge-shaped piece 67 is guided in a radially movable manner relative to swivel axis 17. FIG. 4 shows distinctly that the threaded piece 69 and the wedge-shaped piece 67 can be rotated relative to each, but are connected together in a captive manner by a clip-like snap connection 75 (FIG. 4).

FIGS. 3 and 4 show the fastening or clamping state, in which the wedge-shaped piece 67 is pressed with a wedge-shaped surface 79 against an inner wall of the annular groove 61 that forms an inclined surface 81 when the threaded piece 69 is tightened by a hexagon socket 77. As a result, a force component is generated that tries to pull the wedge-shaped piece 67 and with it the tool disk 1 to the right in the drawing and tries to pull the receiver disk 51 to the left in the drawing, so that the contact surface 55 of the tool disk 1 and the receiving surface 53 of the receiver disk 51 are clamped together. The number of pressure pieces 57, distributed over the periphery, and the tightening torque of the threaded pieces 79 is chosen in conjunction with the geometry of the wedge-shaped surfaces 79 on the wedge-shaped pieces 67 and the geometry of the inclined surfaces 81 of the annular groove 61 in such a way that the resulting frictional locking between the contact surface 55 and the receiving surface 53 can be adjusted to an optimal value. On exceeding a critical torque acting between the tool disk 1 and the receiver disk 51, the wedge-shaped pieces 67 can then slip in the annular groove 61. In this way, a simple design feature offers a safety device that prevents damage from occurring in the event of a "crash" during ongoing operations, for example, in the event that the turret head 3 is jammed when the swivel drive is activated. When the shoulder 65 of the tool disk 1 extends over the cylindrical outer surface 69 of the receiver disk 51 in the clamping or fastening state, the outer surface 59 and the cylindrical inner surface of the shoulder 65 form fitting surfaces for the mutual centering of the tool disk 1 and the receiver disk 51. At the same time, the front face of the receiver disk 51 that forms the receiving surface 55 and the assigned contact surface 53 on the tool disk 1 form fitting surfaces for the axial positioning. To lock in a form fitting manner, the receiver disk 51 and with it the tool disk 1 into the respectively adjusted swivel positions, a locking device is provided in the form of a sliding bolt body 85 that can be displaced hydraulically to engage and disengage a Hirth coupling 87 provided between the bolt body 85 and the receiver disk 51.

While one embodiment has been chosen to illustrate the invention, it will be understood by those skilled in the art that various changes and modifications can be made therein without departing form the scope of the invention as defined in the appended claims.

What is claimed is:

1. A tool turret, comprising:
   a tool disk having at least one tool holder for a machining tool and having a contact surface, said tool disk being swivelable around a support column defining a swivel axis during moving the machining tool in said at least one tool holder into and out of a working position;
   a receiver disk fastened to said tool disk by a receiving surface of said receiver disk being clamped to said contact surface of said tool disk; and
   a clamping device clamping said receiving surface to said contact surface, said clamping device including an annular groove on one of said disks and a pressure piece on the other of said disks, said annular groove being concentric with said swivel axis and being radially open outwardly relative to said swivel axis and having at least one inclined surface, said pressure piece penetrating said annular groove under a compression force and having a wedge-shaped surface interacting with said at least one inclined surface to generate a force component as a clamping force from the compression force, said clamping force pressing said contact surface and said receiving surface against each other to clamp said tool disk to said receiver disk.

2. A tool turret according to claim 1 wherein
   said annular groove is formed in a cylindrical outer surface on said receiver disk, said cylindrical outer surface being concentric to said swivel axis; and
   said tool disk has a shoulder extending over said cylindrical outer surface.

3. A tool turret according to claim 2 wherein
   said shoulder has at least one additional pressure piece arranged thereon.

4. A tool turret according to claim 2 wherein
   said receiver disk comprises a flange-shaped extension of an end of a hollow shaft, said hollow shaft surrounding said support column; and
   a front end face of said extension defines a radial plane forming said receiving surface pressed against said contact surface, said contact surface forming a radial plane internally defining said shoulder of said tool disk.

5. A tool turret according to claim 2 wherein
   said cylindrical outer surface on said receiver disk and a cylindrical inner surface of said shoulder of said tool disk fit together for centering said tool disk on said receiver disk.

6. A tool turret according to claim 2 wherein
   said pressure piece is arranged in a radial borehole in said shoulder of said tool disk, said radial borehole having an internal thread forming a threaded joint generating the compression force.

7. A tool turret according to claim 6 wherein
   said pressure piece comprises a wedge-shaped piece and a threaded piece, said threaded piece being rotatable relative to said wedge-shaped piece, said threaded piece forming a part of said threaded joint with said internal thread.

8. A tool turret according to claim 7 wherein
   said radial borehole has an outer threaded section forming said internal thread engaging an external thread on said threaded piece and has a non-threaded inner guide section fitting said wedge-shaped piece for guiding said wedge-shaped piece.

9. A tool turret according to claim 7 wherein
   said wedge-shaped piece and said threaded piece are attached to prevent axial separation thereof along an axis of relative rotation thereof.

10. A tool turret according to claim 1 wherein
    said annular groove has a V-shaped cross section;
    said pressure piece comprises a wedged-shaped piece forming said wedge-shaped surface; and
    said V-shaped cross section and said wedge-shaped piece have relative positions and dimensions such that said wedge-shaped surface engages with a side wall of said annular groove forming said at least one inclined surface to generate said clamping force.

11. A tool turret according to claim 1 wherein said contact surface and said receiving surface face axially, extend radially relative to said swivel axis, and are directly frictionally engaged to one another.

* * * * *